UNITED STATES PATENT OFFICE.

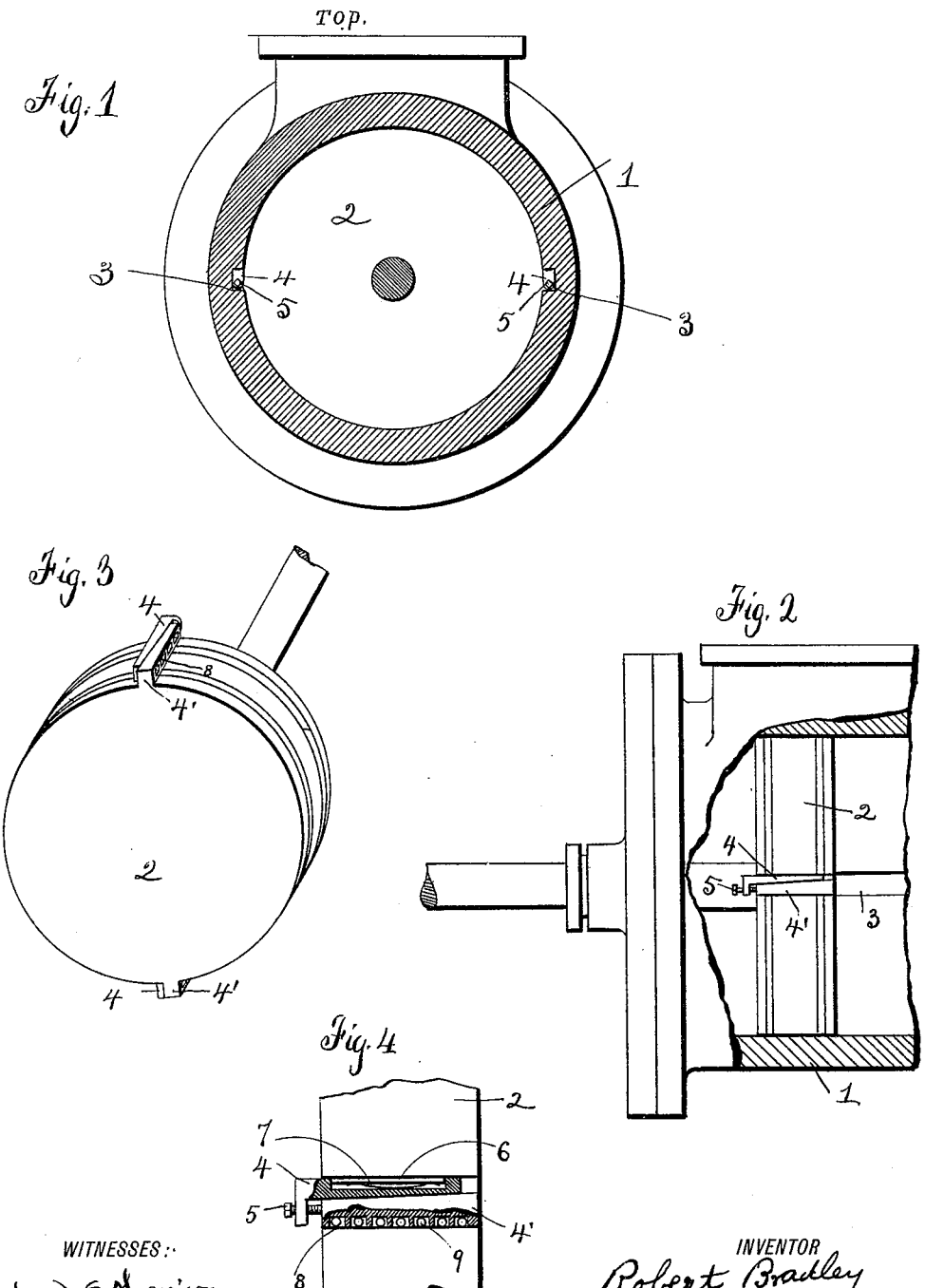

ROBERT BRADLEY, OF PITTSBURG, PENNSYLVANIA.

STEAM-PISTON.

SPECIFICATION forming part of Letters Patent No. 636,713, dated November 7, 1899.

Application filed June 26, 1899. Serial No. 721,962. (No model.)

*To all whom it may concern:*

Be it known that I, ROBERT BRADLEY, a citizen of the United States of America, residing at Pittsburg, in the county of Allegheny and State of Pennsylvania, have invented certain new and useful Improvements in Steam-Pistons; and I do hereby declare the following to be a full, clear, and exact description thereof, reference being had to the accompanying drawings, which form a part of this specification.

This invention relates to certain new and useful improvements in engines.

The invention relates to steam, gas, air, or other forms of engines having reciprocating pistons; and its object is to provide a means of taking up or reducing the wear upon the under side of the piston. In engines having large cylinders the wear is considerable and requires frequent attention and resetting of the cylinder.

With the above object in view the invention consists in the novel construction, combination, and arrangement of parts, as will be hereinafter more fully described in detail.

In describing the invention in detail reference is had to the accompanying drawings, forming a part of this specification, wherein like numerals of reference designate like parts in the several views.

Figure 1 is an end sectional view through a cylinder, exposing the interior of the cylinder and the piston-head with my improvements attached. Fig. 2 is a side view of the same, partly in section. Fig. 3 is a perspective view of the piston removed from the cylinder. Fig. 4 is a vertical side view of a portion of the piston, showing a portion of my improvement in section.

In the drawings the numeral 1 designates the cylinder, and 2 the piston. These parts may be of any desired form or dimensions. Formed within the side walls of the cylinder and at diametrical points are the grooves 3. These grooves extend the length of the cylinder. Upon the sides of the piston is arranged a pair of guides to engage within the cylinder-grooves and relieve the weight of the piston upon the under side of the cylinder. These guides I prefer to construct of the two parts 4 and 4', which are tapered at their contact-surfaces, so as to take up the wear. One of the parts is provided with a set-screw 5 at one end for the purpose of adjustment when it is desired to take up the wear.

If desired, a seat may be formed within the upper side of the slides, and within this seat may be placed a packing-strip 6, which is actuated outwardly by a suitable spring 7.

To decrease the friction at the under side of the slides, a series of pockets 8 may be formed therein and provided with antifriction-balls 9, or instead of balls rollers may be used. By this means I am able to transfer the wear upon the under side of the piston to the guides and guideways.

I do not desire to confine myself to the exact detail construction herein shown, as the grooves may be placed within the piston and the guides placed within the cylinder. Again, the packing may be dispensed with, or the packing may be placed within the grooves instead of the slides, or packing may be used on both sides of either the slides or grooves. Such alterations will not depart from the spirit of my invention, as they will produce equivalent results.

Having thus fully shown and described my invention, what I claim as new, and desire to secure by Letters Patent, is—

1. The combination with a cylinder and its reciprocating piston, of grooves formed within the interior walls of said cylinder, slides upon the piston adapted to fit in said grooves, and means whereby the wear of said slides is taken up.

2. The combination with the interior of a cylinder and its reciprocating piston, of slides carried by said piston, grooves formed within the interior sides of the cylinder in which fit said slides, packing arranged between said slides and grooves, and means whereby the friction is reduced carried by said slides.

In testimony whereof I have hereunto affixed my signature in the presence of two subscribing witnesses.

ROBERT BRADLEY.

Witnesses:
  H. W. STEVENSON,
  WM. EVANS.